W. A. WINN.
FEED BIN FOR ANIMALS.
APPLICATION FILED AUG. 26, 1918.
1,324,532.
Patented Dec. 9, 1919.
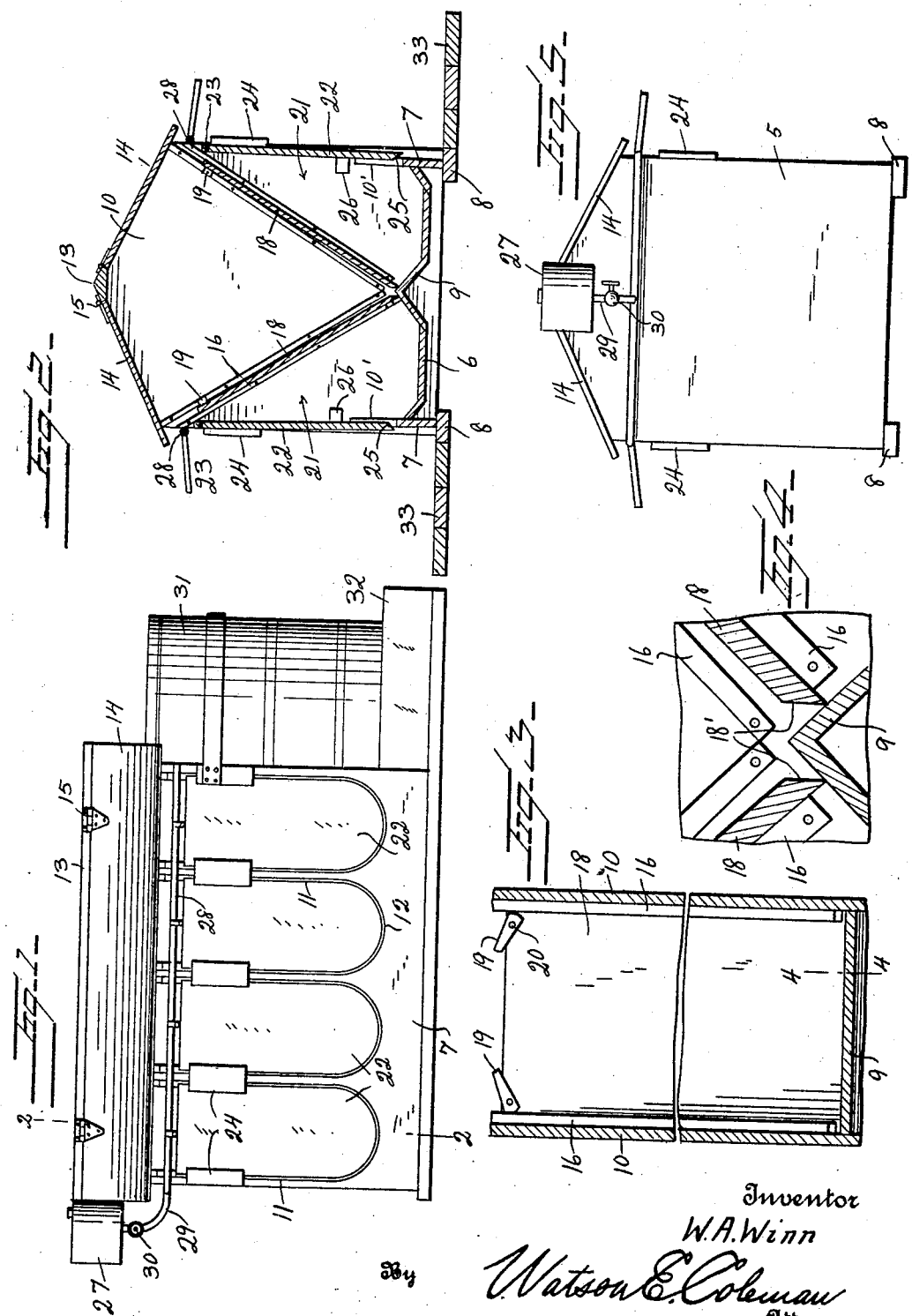
Inventor
W. A. Winn
By Watson E. Coleman
Attorney

UNITED STATES PATENT OFFICE.

WARNER ALBERT WINN, OF CLARKSVILLE, TENNESSEE, ASSIGNOR TO WOODSON S. BALDWIN, OF CLARKSVILLE, TENNESSEE.

FEED-BIN FOR ANIMALS.

1,324,532. Specification of Letters Patent. Patented Dec. 9, 1919.

Application filed August 26, 1918. Serial No. 251,528.

*To all whom it may concern:*

Be it known that I, WARNER A. WINN, a citizen of the United States, residing at Clarksville, in the county of Montgomery and State of Tennessee, have invented certain new and useful Improvements in Feed-Bins for Animals, of which the following is a specification, reference being had to the accompanying drawings.
This invention relates to an improved feed bin for animals, and has for its primary object to provide a bin having a plurality of chambers to receive different kinds of feed and a separate trough for each chamber, adjustable means for regulating the flow of the feed into the trough, and animal actuated means normally closing the outer side of the trough.

It is another important detail object of my invention to provide an adjustable feed regulating gate which is mounted and arranged so that it may be vibrated by the animal to loosen the feed and prevent clogging thereof.
It is also an important object of my invention to provide an animal feed bin wherein the several parts are very compactly arranged, while at the same time, provision is made for the feeding of a large number of animals without waste.

The present invention also contemplates the provision of improved means in combination with the feed bin, whereby oil or other vermin destroying agent may be applied to the hides of the animals while feeding.

And it is a further general object of my invention to provide a device as above characterized which is strong and durable in its construction, capable of manufacture at comparatively small cost, and highly serviceable and convenient in practical use.

With the above and other objects in view, the invention consists in the improved combination, construction and relative arrangement of the several parts as will be hereinafter more fully described, subsequently claimed and illustrated in the accompanying drawing in which similar reference characters designate corresponding parts throughout the several views, and wherein:—

Figure 1 is a side elevation of an animal feed bin constructed in accordance with the preferred embodiment of my invention;

Fig. 2 is a transverse section taken on the line 2—2 of Fig. 1;

Fig. 3 is an interior face view illustrating the mounting of the adjustable feed regulating gates;

Fig. 4 is an enlarged detail section taken on the line 4—4 of Fig. 3; and

Fig. 5 is an end elevation.

Referring in detail to the drawings, 5 designates the two end walls of the body of the bin which are connected by the bottom wall 6 and the longitudinal side walls 7. To the lower edges of said side walls, the longitudinal sills or runners 8 are secured, which provide means whereby the structure may be easily moved over the ground from place to place. The bottom wall 6 is provided with upwardly inclined portions 9 forming a central longitudinally extending ridge.

Between the side walls 7 of the bin structure, a plurality of spaced vertical partitions 10 are arranged and suitably secured to said side walls and the bottom wall 6. Between the partitions 10, the side walls 7 are cut away to afford vertically extending openings 11, the lower ends of which are of semi-circular form, as shown at 12. The upper edges of the partition walls 10 are inclined upwardly from their vertical side edges to the center, and are connected by a ridge bar 13, to which the lids or cover members 14 are hinged, as at 15. These hinged covers normally close the upper ends of the several chambers formed by the spaced partition walls 10.

To the sides of each partition wall 10 and to the outer faces of the end walls 5, the pairs of guide cleats 16 are secured, the said pairs of cleats extending inwardly and downwardly from the outer edges of the partition walls at their upper ends to a point adjacent the ridge 9 centrally formed in the bottom wall 6. It is also to be observed that the cleats 16 in each pair are convergently disposed from their lower to their upper ends so that the space between said cleats gradually decreases in width toward the upper ends thereof.

Between each pair of cleats 16, a feed regulating gate 18 is slidably mounted. The lower edge of this gate is beveled, as at 18', and normally engages the inclined face of one side of the ridge 9 to thereby effectually prevent the escape of the feed from the bin chamber. To the inner face of the gate 18 at its upper end and at each vertical edge thereof, a cam lever 19 is pivoted and is adapted to have binding, frictional engagement with one of the cleats 16, whereby said gate may be securely held in its adjusted position. The pivot pins or bolts 20 for these cam levers are loosely engaged in relatively large openings in the feed regulating gate so as to permit of a vibratory or oscillating movement of the gate. By this means the feed regulating gate can be vibrated without danger of disengaging the levers 19 from the cleats 16. The feed gate can therefore be maintained indefinitely in the desired adjusted position without the holding operation of the levers 19 or the vibratory movement of the gate interfering with each other.

It will be seen from the above description that the partition walls forming the separate bin chambers also provide, in conjunction with the feed gates 18 and the side walls 7, an individual trough, indicated at 21, for each bin chamber. The outer open sides of these troughs are normally closed by means of the doors 22 which are loosely mounted at their upper ends for swinging movement upon a rod 23 fixed in the partition walls 10. To the outer vertical edge of each partition wall, and projecting laterally from the opposite side faces thereof, the stops 24 are secured to limit the outward, swinging movement of the doors 22. Each of said doors has a rounded lower end edge which is beveled or inclined downwardly from its inner to its outer face, as shown at 25. When the feed doors are in their normal positions, the outer faces thereof are disposed in a plane outwardly of the outer side faces of the walls 7, as it will be observed that these walls are set into vertical recesses 10' in the lower vertical edges of the partition walls 10. Thus, all possibility of fowls gaining access to the feed trough or water entering the same is obviated. It is also to be noted that the side walls 7 at each feed opening 11 is provided with the curved edge 12 so that one animal cannot thrust another animal away which is feeding from the trough and also insert its head over the edge of the wall 7 and into the trough. Each feed door 22 is preferably provided upon its inner face with one or more bumpers 26, preferably of rubber, which are adapted for contact with the feed regulating gate 18. The animal by thrusting its head inwardly against the feed door and then releasing pressure thereon, thereby causing the bumpers 26 to engage and oscillate or vibrate the gate 18, thus loosening the clogged material. Such a vibration of the gate is possible owing to the fact that there is a relatively wide space between the guide cleats 16 at the lower end of the gate.

In conjunction with my improved feed bin, I preferably provide a tank 27 centrally mounted at one end of the bin and at the top thereof to contain a suitable oil or other vermin destroying agent. Pipes 28 extend longitudinally along the opposite sides of the feed bin at the upper ends of the openings 11 and in proper spaced relation thereto and are connected by a common supply pipe 29 to the bottom of the tank 27. A cut-off valve 30 is interposed in this pipe so that the supply of oil to the pipe 29 may be properly controlled or entirely cut off. These pipes 28 are perforated or provided with spaced orifices, through which the oil drops upon the backs of the animals feeding at the several troughs.

I also preferably arrange at the opposite end of the bin a water supply tank 31 which is equipped with a suitable float controlled valve, whereby the supply of water in the trough 32 at the lower end of said tank will be automatically replenished. I have likewise illustrated in the drawings a suitable approach platform or floor 33, which is arranged at each side of the bin adjacent to the skids or sills 8.

From the foregoing description, taken in connection with the accompanying drawings, the construction, manner of operation, and several advantages of my improved animal feed bin will be clearly and fully understood. It will be seen that when the feed regulating gates 18 are closed, the feed contained in the several bin chambers is adequately protected against the deteriorating effects of the elements and access thereto by rats or other rodents is also effectually prevented. The several bin chambers may contain different kinds of feed or they may all contain feed of the same character when a large number of animals are being fed at the same time. By properly adjusting the gates 18, the flow of the feed from the several bin chambers into the troughs may be properly regulated. The device as a whole is of relatively simple construction, compact and durable in the arrangement of its several parts and capable of manufacture at relatively small cost.

While I have herein shown and described the preferred form, construction and arrangement of the various elements, it is to be understood that the device is susceptible of considerable modification therein and I, accordingly, reserve the privilege of adopting all such legitimate changes as may be fairly embodied within the spirit and scope of the invention as claimed.

I claim:—

1. In an animal feed bin, a feed receiving chamber and trough, guide cleats carried by the side wall of the chamber, said cleats diverging from their upper to their lower ends, an adjustable feed regulating gate slidably mounted between the cleats and controlling the flow of the feed from the chamber into the trough, means carried by the upper end of the gate for pivotally securing the gate in its adjusted position and permitting vibratory movement of said gate between the guide cleats, and a swingingly mounted door normally closing the open side of the trough and adapted to be forced inwardly by the head of the animal and operatively engaged with the adjustable gate to vibrate the same.

2. In an animal feed bin, a feed receiving chamber and trough, guide cleats carried by the side wall of the chamber, said cleats diverging from their upper to their lower ends, an adjustable feed regulating gate slidably mounted between the cleats and controlling the flow of the feed from the chamber into the trough, means carried by the upper end of the gate for pivotally securing the gate in its adjusted position and permitting vibratory movement of said gate between the guide cleats, a swingingly mounted door normally closing the open side of the trough and adapted to be forced inwardly by the head of the animal, an abutment member on said door adapted to operatively engage the gate and vibrate the same, and stop means limiting the swinging movement of said door to its normal position and supporting the door with its outer face disposed in a plane outwardly of the outer face of the wall of the trough.

In testimony whereof I hereunto affix my signature in the presence of two witnesses.

WARNER ALBERT WINN.

Witnesses:
F. E. BROWN,
I. W. KERR.